US012643170B2

(12) United States Patent
Ozaki et al.

(10) Patent No.: US 12,643,170 B2
(45) Date of Patent: Jun. 2, 2026

(54) WELDING SYSTEM, WELDING METHOD, WELDING SUPPORT DEVICE, PROGRAM, LEARNING DEVICE, AND METHOD OF GENERATING TRAINED MODEL

(71) Applicant: KOBE STEEL, LTD., Hyogo (JP)

(72) Inventors: Keita Ozaki, Hyogo (JP); Akira Okamoto, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 714 days.

(21) Appl. No.: 18/040,121

(22) PCT Filed: Aug. 25, 2021

(86) PCT No.: PCT/JP2021/031262
§ 371 (c)(1),
(2) Date: Jan. 31, 2023

(87) PCT Pub. No.: WO2022/080015
PCT Pub. Date: Apr. 21, 2022

(65) Prior Publication Data
US 2023/0264285 A1 Aug. 24, 2023

(30) Foreign Application Priority Data
Oct. 16, 2020 (JP) ................................ 2020-174445

(51) Int. Cl.
*B23K 9/00* (2006.01)
*B23K 9/095* (2006.01)
*B23K 31/00* (2006.01)
*B23K 31/12* (2006.01)

(52) U.S. Cl.
CPC .......... *B23K 9/0953* (2013.01); *B23K 9/0956* (2013.01); *B23K 31/006* (2013.01); *B23K 31/125* (2013.01)

(58) Field of Classification Search
CPC ... B23K 9/0956; B23K 31/006; B23K 9/0953
See application file for complete search history.

(56) References Cited

U.S. PATENT DOCUMENTS

| | | | |
|---|---|---|---|
| 5,283,418 A | 2/1994 | Bellows et al. | |
| 10,682,729 B2 | 6/2020 | Witney | |
| 11,292,072 B2 | 4/2022 | Nakagawa et al. | |

(Continued)

FOREIGN PATENT DOCUMENTS

| | | |
|---|---|---|
| JP | H10-235490 A | 9/1998 |
| JP | 2020-163453 A | 10/2020 |

*Primary Examiner* — Erin B Saad
(74) *Attorney, Agent, or Firm* — Studebaker Brackett PLLC

(57) ABSTRACT

This welding system comprises: a welding device, various different types of a plurality of sensors which detect an event according to welding performed by a welding device; and an estimation unit which uses a trained model that is pre-generated by machine-learning by taking, as input data, a plurality of pieces of data for learning obtained by detecting events according to welding by means of the same types of sensors as the plurality of sensors, and, as training data, labels representing whether the welding is normal or abnormal, thereby estimating an abnormality of the welding performed by the welding device from a plurality of pieces of detection data generated by the plurality of sensors.

11 Claims, 13 Drawing Sheets

(56) References Cited

U.S. PATENT DOCUMENTS

| | | | | |
|---|---|---|---|---|
| 2019/0160578 | A1 | 5/2019 | Nakagawa et al. | |
| 2022/0331912 | A1* | 10/2022 | Ozaki | B23K 37/0282 |
| 2023/0064432 | A1* | 3/2023 | Ozaki | B23K 31/006 |
| 2023/0264285 | A1* | 8/2023 | Ozaki | G06N 3/0442 |
| | | | | 219/137 R |
| 2023/0267593 | A1* | 8/2023 | Yoshimoto | G06T 7/149 |
| | | | | 382/141 |
| 2024/0424679 | A1* | 12/2024 | Yoshimoto | G06T 7/73 |

* cited by examiner

DATA SET FOR LEARNING

| CAMERA IMAGE | IMAGE CAPTURE TIMING | SPECTROGRAM | LABEL |
|---|---|---|---|
| A | a SEC. | a-1 TO a SEC. | NORMAL |
| B | b SEC. | b-1 TO b SEC. | ABNORMAL |
| C | c SEC. | c-1 TO c SEC. | NORMAL |
| D | d SEC. | d-1 TO d SEC. | ABNORMAL |
| E | e SEC. | e-1 TO e SEC. | NORMAL |
| | | | |

CAMERA IMAGE

SPECTROGRAM

LEARNING PHASE

START

S11 ACQUIRE DATA SET FOR LEARNING

S12 INPUT CAMERA IMAGES AND SPECTROGRAM OF WELDING SOUND TO MODEL

S13 CALCULATION BASED ON MODEL

S14 OUTPUT WELDING ABNORMALITY FROM MODEL

S15 CALCULATE ERROR FROM LABEL

S16 ERROR BACK-PROPAGATION CALCULATION

END

FIG. 10

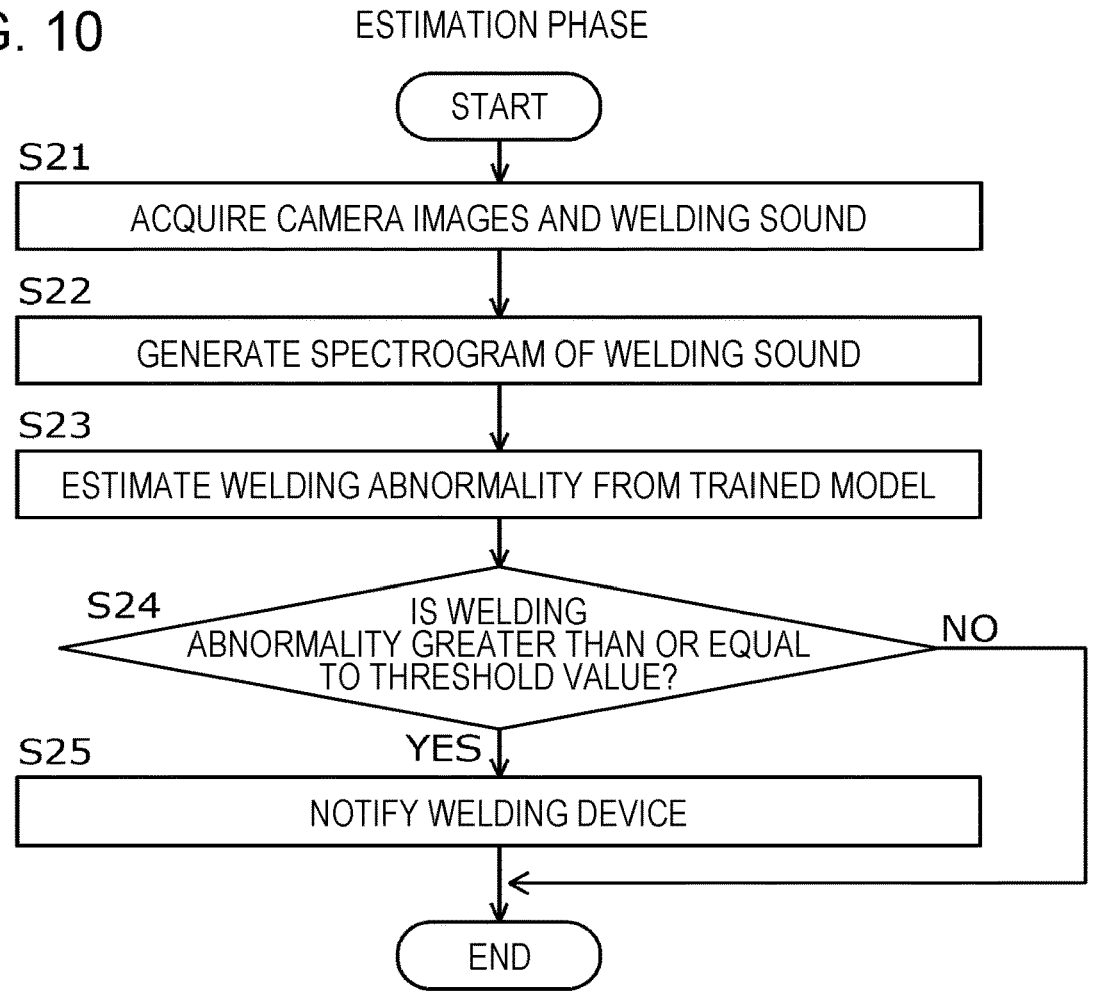

ESTIMATION PHASE

START

S21 — ACQUIRE CAMERA IMAGES AND WELDING SOUND

S22 — GENERATE SPECTROGRAM OF WELDING SOUND

S23 — ESTIMATE WELDING ABNORMALITY FROM TRAINED MODEL

S24 — IS WELDING ABNORMALITY GREATER THAN OR EQUAL TO THRESHOLD VALUE? — NO

YES

S25 — NOTIFY WELDING DEVICE

END

FIG. 11

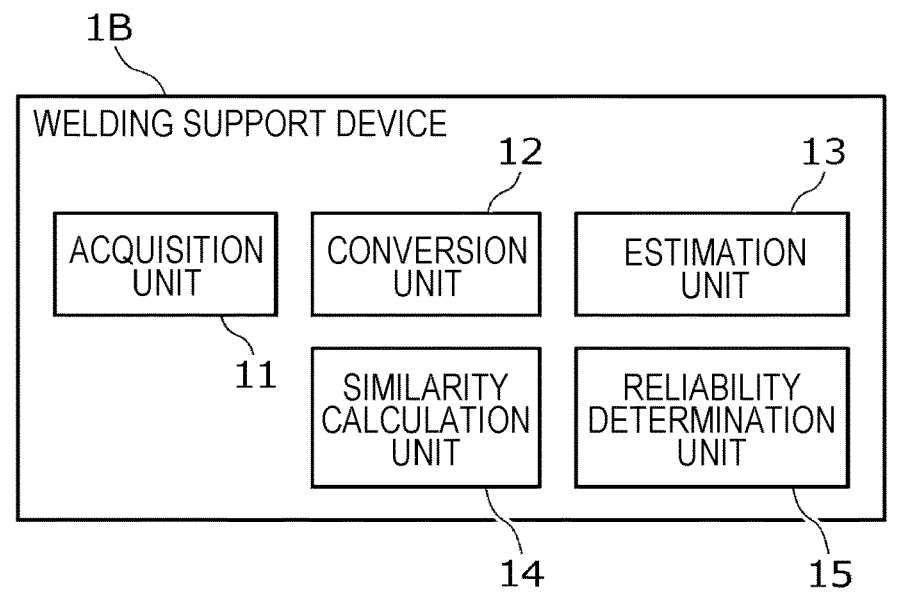

1B

WELDING SUPPORT DEVICE

| ACQUISITION UNIT | CONVERSION UNIT 12 | ESTIMATION UNIT 13 |

11

| SIMILARITY CALCULATION UNIT | RELIABILITY DETERMINATION UNIT |

DATA SET FOR LEARNING

| CAMERA IMAGE | IMAGE CAPTURE TIMING | FEATURE POINTS | SPECTROGRAM | INTERVAL OF ABNORMAL QUALITY | LABEL |
|---|---|---|---|---|---|
| A | a SEC. | A1 TO A5 | a TO a-1 SEC. | NORMAL | NORMAL |
| B | b SEC. | B1 TO B5 | b TO b-1 SEC. | ABNORMAL QUALITY | ABNORMAL |
| C | c SEC. | C1 TO C5 | c TO c-1 SEC. | NORMAL | NORMAL |
| D | d SEC. | D1 TO D5 | d TO d-1 SEC. | ABNORMAL QUALITY | ABNORMAL |
| E | e SEC. | E1 TO E5 | e TO e-1 SEC. | ABNORMAL QUALITY | NORMAL |

ESTIMATION PHASE

GENERATION OF DATA FOR LEARNING

ESTIMATION PHASE

WELDING SYSTEM, WELDING METHOD, WELDING SUPPORT DEVICE, PROGRAM, LEARNING DEVICE, AND METHOD OF GENERATING TRAINED MODEL

TECHNICAL FIELD

The present invention relates a welding system, a welding method, a welding support device, a program, a learning device, and a method of generating a trained model.

BACKGROUND ART

PTL 1 discloses a technique in which images of a molten pool, and a ripple shape and a geometric shape of a fillet portion are captured by a camera, and received by a processor which communicates with a database that stores associated potential defects of welding along with an image of a molten pool of a mock weld zone and an image of a ripple shape of a mock weld zone and a geometric shape of a fillet portion, and calculates an aggregate probability that a defect occurs at a welding position corresponding to an image captured by a camera based on the potential defects associated in the database.

CITATION LIST

Patent Literature

PTL 1: Japanese Unexamined Patent Application Publication No. 2017-106908

SUMMARY OF INVENTION

Technical Problem

Meanwhile, some welding defects occur in a surface part, whereas other welding defects occur internally, and welding defects which can be inspected with a camera are mostly limited to the defects that occur in a surface part. In addition, in arc welding, a weld zone may be interfered by arc light, thus it is difficult to inspect the weld quality with high accuracy only by images obtained by a camera.

In addition, welding sound and the waveform of the current or the voltage of a welding power source are disturbed by a welding failure, but are not necessarily associated with an occurrence of a welding defect, thus it is difficult to inspect the weld quality with high accuracy only with measured data of each amount.

The present invention has been made in consideration of the above-mentioned problem, and it is a main object to provide a welding system, a welding method, a welding support device, a program, a learning device, and a method of generating a trained model that are capable of improving the accuracy of prediction of a welding quality.

Solution to Problem

In order to solve the above-mentioned problem, a welding system in an aspect of the present invention includes: a welding device; a plurality of sensors in different types, which detect an event according to welding performed by the welding device; and an estimation unit that estimates an abnormality of the welding performed by the welding device from a plurality of pieces of detection data generated by the plurality of sensors, using a trained model that is pre-generated by machine-learning by taking, as input data, a plurality of pieces of data for learning obtained by detecting events according to welding by same types of sensors as the plurality of sensors, and, as training data, labels representing whether the welding is normal or abnormal.

In addition, a welding method in another aspect of the present invention includes: detecting an event according to welding performed by a welding device by a plurality of sensors in different types; and estimating an abnormality of the welding performed by the welding device from a plurality of pieces of detection data generated by the plurality of sensors, using a trained model that is pre-generated by machine-learning by taking, as input data, a plurality of pieces of data for learning obtained by detecting events according to welding by same types of sensors as the plurality of sensors, and, as training data, labels representing whether the welding is normal or abnormal.

In addition, a welding support device in another aspect of the present invention includes: an acquisition unit that acquires a plurality of pieces of detection data generated by a plurality of sensors in different types, which detect an event according to welding performed by a welding device; and an estimation unit that estimates an abnormality of the welding performed by the welding device from the plurality of pieces of detection data generated by the plurality of sensors, using a trained model that is pre-generated by machine-learning by taking, as input data, a plurality of pieces of data for learning obtained by detecting events according to welding by same types of sensors as the plurality of sensors, and, as training data, labels representing whether the welding is normal or abnormal.

In addition, a program in another aspect of the present invention causes a computer to execute a process including: acquiring a plurality of pieces of detection data generated by a plurality of sensors in different types, which detect an event according to welding performed by a welding device; and estimating an abnormality of the welding performed by the welding device from the plurality of pieces of detection data generated by the plurality of sensors, using a trained model that is pre-generated by machine-learning by taking, as input data, a plurality of pieces of data for learning obtained by detecting events according to welding by same types of sensors as the plurality of sensors, and, as training data, labels representing whether the welding is normal or abnormal.

In addition, a learning device in another aspect of the present invention includes: an acquisition unit that acquires a data set for learning including a plurality of pieces of data for learning obtained by detecting events according to welding by a plurality of sensors in different types, and labels representing whether the welding is normal or abnormal; and a learning unit that generates a trained model to estimate an abnormality of welding from a plurality of pieces of detection data obtained by detecting events according to welding with same types of sensors as the plurality of sensors, by taking the plurality of pieces of data for learning as input data, and the labels as training data.

A method of generating a trained model in another aspect of the present invention includes: acquiring a data set for learning including a plurality of pieces of data for learning obtained by detecting events according to welding by a plurality of sensors in different types, and labels representing whether the welding is normal or abnormal; and generating a trained model to estimate an abnormality of welding from a plurality of pieces of detection data obtained by detecting events according to welding with same types of sensors as the plurality of sensors, by taking the plurality of pieces of data for learning as input data, and the labels as training data.

Advantageous Effects of Invention

According to the present invention, it is possible to improve the accuracy of prediction of a welding quality.

BRIEF DESCRIPTION OF DRAWINGS

FIG. 10 is a flowchart illustrating a procedure example of an inference phase.

FIG. 11 is a diagram illustrating another configuration example of a welding support device.

FIG. 12 is a table illustrating another example of a data set for learning.

DESCRIPTION OF EMBODIMENTS

Hereinafter an embodiment of the present invention will be described with reference to the drawings.

First Embodiment (1) System Overview

Figure 1:
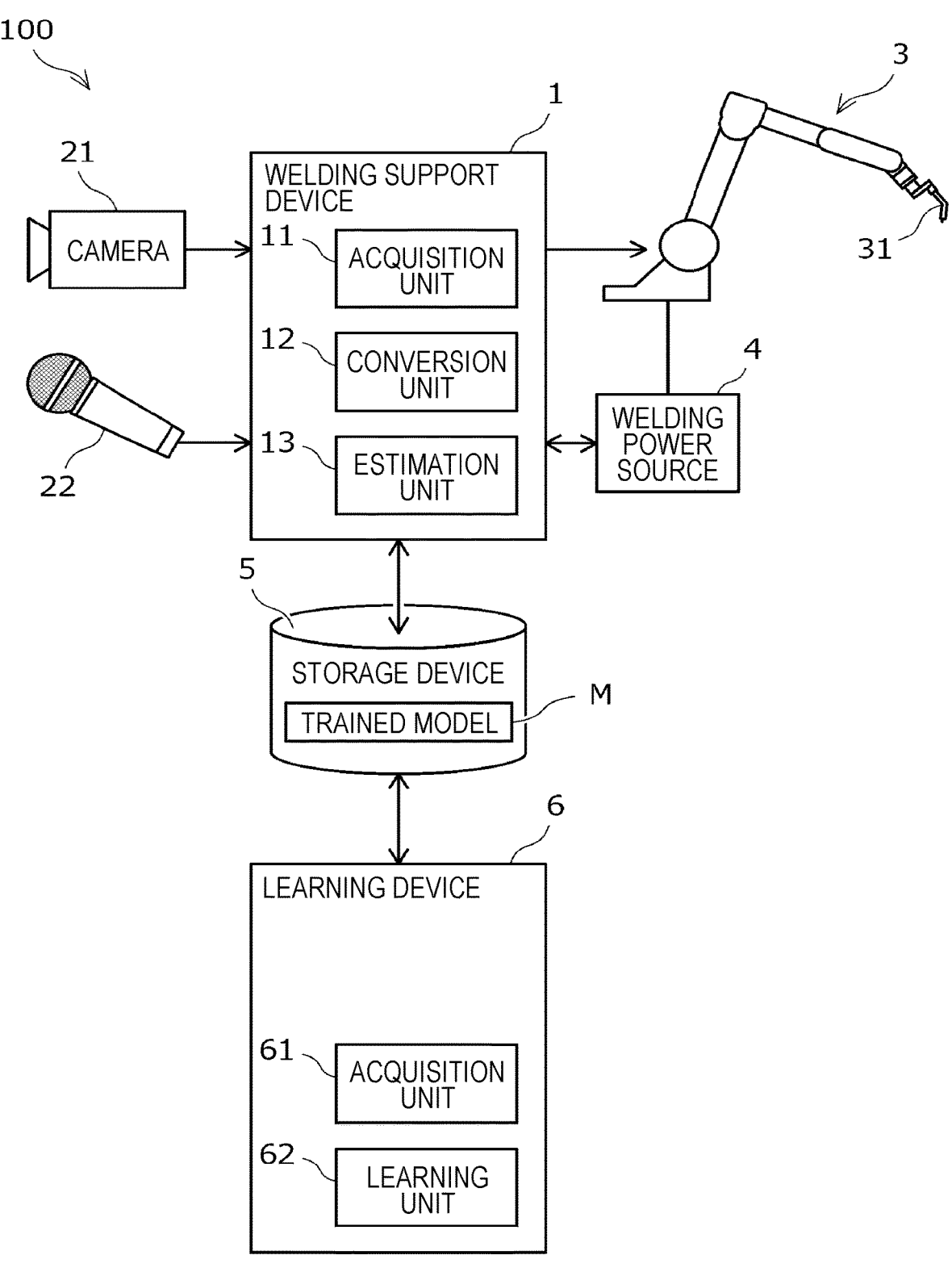
FIG. 1 is a diagram illustrating a configuration example of a welding system.
Figure 2:
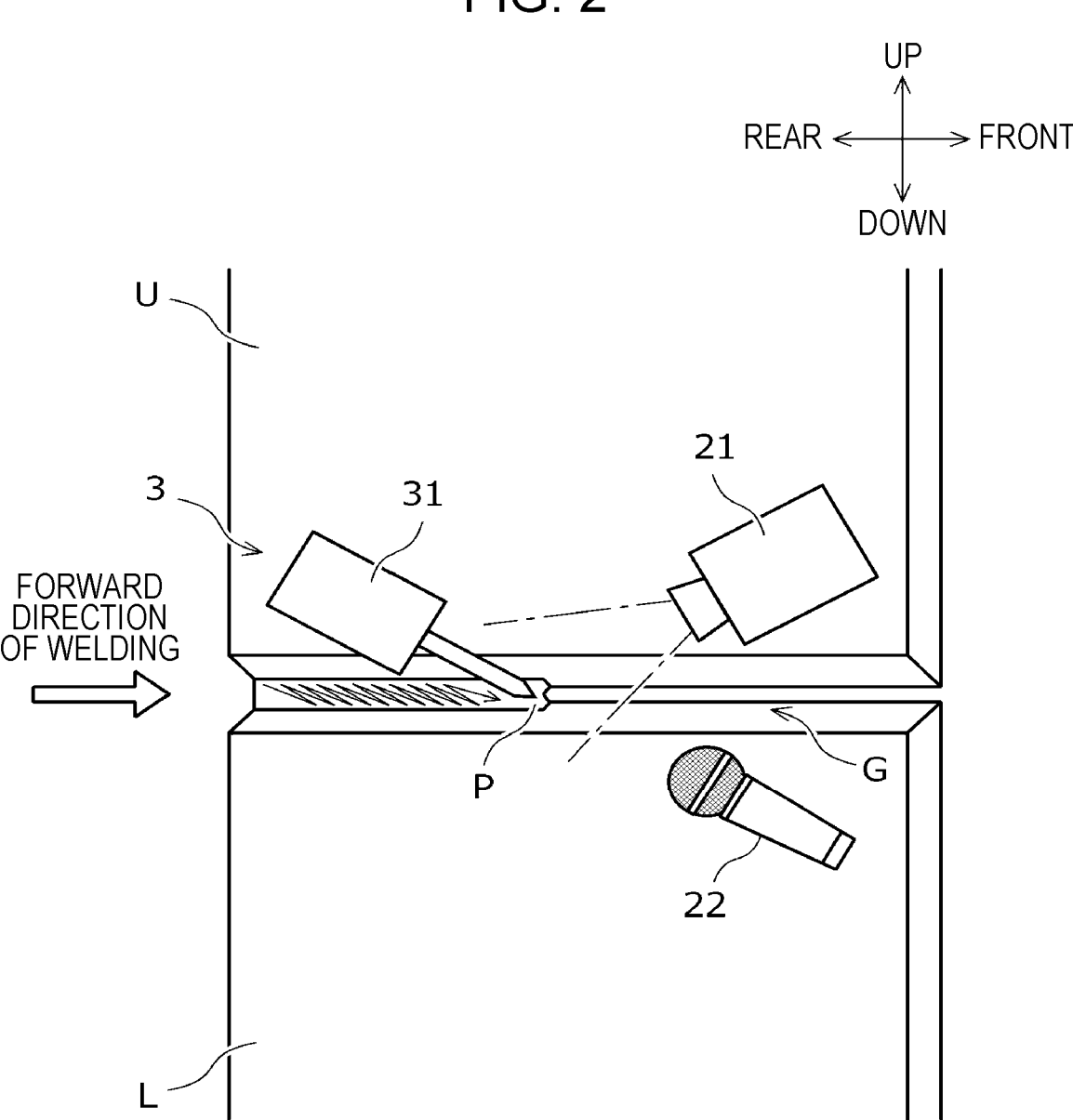
FIG. 2 is a view illustrating a welding example by a welding device.

FIG. 1 is a diagram illustrating a configuration example of a welding system 100 according to an embodiment. FIG. 2 is a view illustrating a welding example by a welding device 3 of the welding system 100.

As illustrated in FIG. 1, the welding system 100 includes a welding support device 1, a camera 21, a microphone 22, a welding device 3, a welding power source 4, a storage device 5, and a learning device 6. The camera 21, the microphone 22, the welding device 3, the welding power source 4, and the storage device 5 are connected to the welding support device 1 to enable communication therebetween.

The welding support device 1 is a computer including a CPU, a GPU, a RAM, a ROM, a non-volatile memory, and an I/O interface. The CPU of the welding support device 1 executes information processing in accordance with a program loaded from the ROM or the non-volatile memory to the RAM.

The welding support device 1 includes an acquisition unit 11, a conversion unit 12, and an estimation unit 13. These functional units are implemented by the CPU of the welding support device 1 executing information processing in accordance with a program.

The program may be supplied, for example, via an information storage medium such as an optical disk or a memory card, or may be supplied, for example, via a communication network such as the Internet or a LAN.

The learning device 6 is also a computer similar to the welding support device 1. The learning device 6 includes an acquisition unit 61 and a learning unit 62.

The welding support device 1 and the learning device 6 are accessible to the storage device 5. The storage device 5 stores a trained model M generated by the learning device 6, and the trained model M can be read by the welding support device 1.

As illustrated in FIG. 2, in this embodiment, the welding device 3 is a welding robot that performs arc welding in a groove G formed between two to-be-welded members U, L while advancing a welding torch 31. A molten pool P is formed in a weld zone during arc welding.

In the example illustrated, the to-be-welded members U, L are arranged in a vertical direction (up-down direction), and the groove G extends in a horizontal direction (front-rear direction). Without being limited to this, the to-be-welded members U, L may be arranged in a horizontal direction.

The distance between the to-be-welded members U, L is, for example, around 3 to 10 mm. A backing material may be applied or may not be applied to the to-be-welded members U, L. The shape of the groove G is not limited to a V shape as illustrated, and may be an X shape.

The arc welding is, for example, TIG (Tungsten Inert Gas) welding. Without being limited to this, the arc welding may be MIG (Metal Inert Gas) welding or MAG (Metal Active Gas) welding.

The welding device 3 performs arc welding while weaving the welding torch 31. For example, when the to-be-welded members U, L are arranged in an up-down direction and the welding direction is the forward direction, to prevent sagging of the molten pool P, weaving of the welding torch 31 is performed in a lower front to upper rear direction.

The camera 21 captures an image of the weld zone during arc welding to generate image data. Hereinafter the image data generated by the camera 21 is referred to as the "camera image". The camera 21 is an example of a sensor that detects an event according to arc welding, and the camera image is an example of data for learning and detection data.

Specifically, the camera 21 captures an image of the molten pool P which is formed in the vicinity of the tip end of the welding torch 31. In addition to the molten pool P, the image capture range of the camera 21 also includes an arc generated from the tip end of the welding torch 31 and a wire (filler metal) extended to the molten pool P.

The camera 21 is disposed forward or rearward of the welding torch 31, and is moved in a forward direction along with the welding torch 31. To reduce incidence of arc light, the lens of camera 2 is provided with a band-pass filter which allows only near-infrared light in the vicinity of 950 nm to pass therethrough.

The camera 21 is a video camera that generates video images including a plurality of time series still images (frames). Without being limited to this, the camera 21 may be a still camera that generates a plurality of time series still images by periodical image capturing.

The microphone 22 records welding sound during arc welding to generate sound data. Hereinafter the welding sound data generated by the microphone 22 is simply referred to as "welding sound". The microphone 22 is an example of a sensor that detects events according to the arc welding, and the welding sound is an example of data for learning and detection data.

The welding power source 4 (see FIG. 1) supplies power source for arc welding to the welding device 3. For example, constant current characteristics or constant voltage characteristics are applied to the output characteristics of the welding power source 4. The welding power source 4 includes a voltmeter and an ammeter, and measures the voltage and the current during arc welding.

Hereinafter the voltage and current data during arc welding measured by the welding power source 4 are simply referred to as the "voltage" and the "current". The voltmeter and the ammeter included in the welding power source 4 are an example of a sensor that detects an event according to arc welding, and the voltage and the current are an example of data for learning and detection data.

In this embodiment, the camera 21, the microphone 22 and the welding power source 4 are mentioned as an example of a sensor; however, as long as a sensor can detect an event according to arc welding, the sensor is not limited to these examples.

(2) Learning Phase

Hereinafter the learning phase implemented in the learning device 6 as a method of generating a trained model according to the embodiment will be described. In this embodiment, so-called multimodal learning, in which a plurality of types of data are used as input data, is performed.

Figures 3, 4:
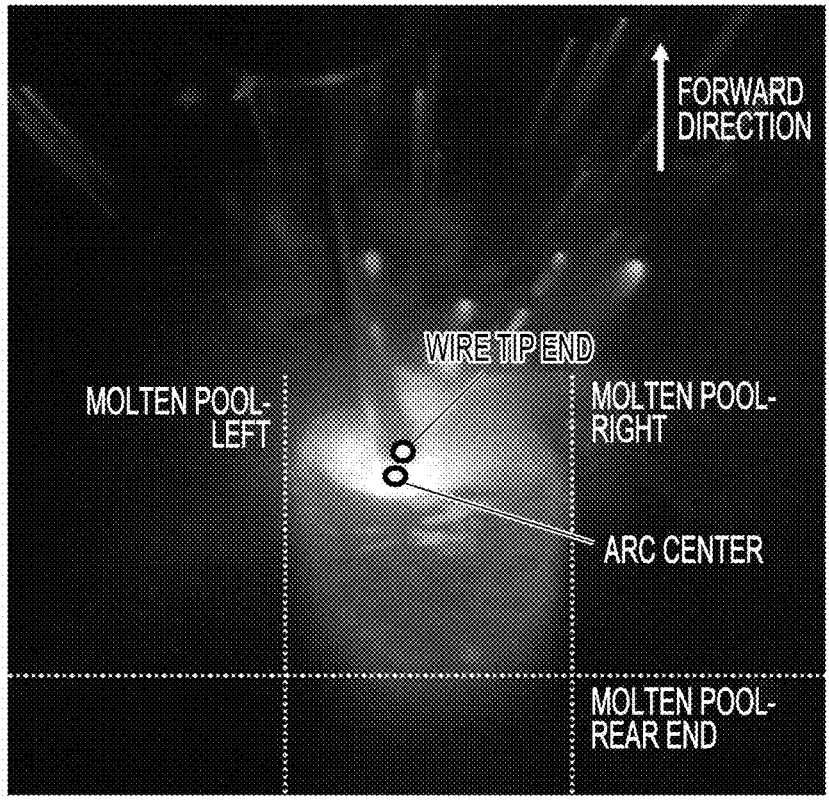
FIG. 3 is a table for explaining a data set for learning.
FIG. 4 is a picture illustrating an example of an image obtained by capturing a weld zone during welding.

FIG. 3 is a table for explaining the data set for learning used in the learning phase. The data set for learning includes camera images obtained by capturing a weld zone during arc welding, spectrograms of welding sound and labels representing normal/abnormal. The camera images and the spectrograms are examples of a plurality of pieces of data for learning, and used as input data. The labels are used as training data.

FIG. 4 is a picture illustrating an example of a camera image. The camera image includes a molten pool, an arc, and a wire. The camera image is generated by the camera 21 capturing an image with a rate of around 100 fps (frame per second), for example. In FIG. 4, for the purpose of description, the left end of the molten pool, the right end of the molten pool, the rear end of the molten pool, the center of the arc, and the tip end of the wire are each denoted by a dotted line or a circle mark. Note that these are explained as feature points in the later-described second embodiment.

Figure 5:
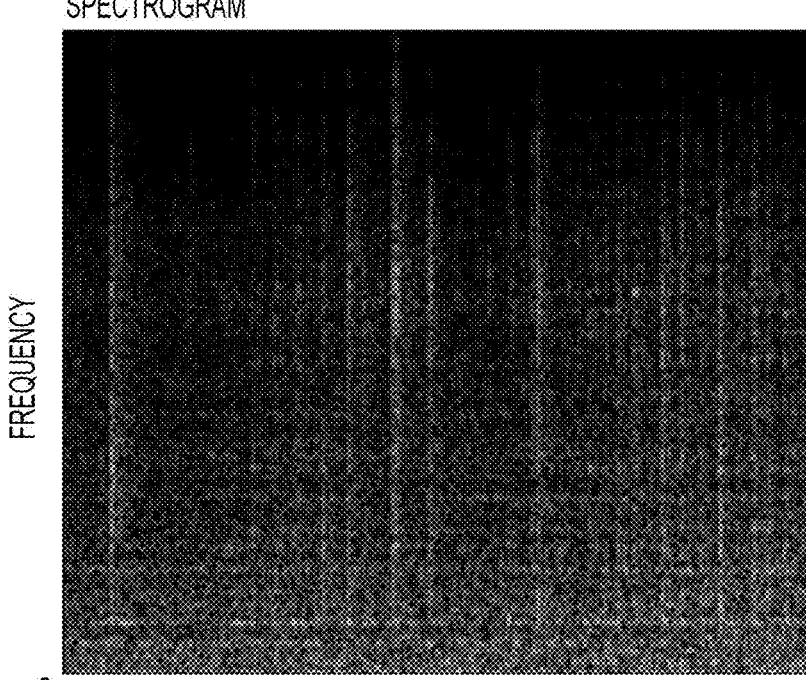
FIG. 5 is a picture illustrating an example of a spectrogram of welding sound.

FIG. 5 is a picture illustrating an example of a spectrogram of welding sound. The spectrogram is a graph that is obtained by performing Fourier transform successively with time, and represents welding sound in terms of three dimensions: time, frequency, and strength. In FIG. 5, the horizontal axis represents time, the vertical axis represents frequency, and color (or brightness) represents strength. The welding sound is generated by recording it by the microphone 22 with a sampling rate of around 44.1 kHz, for example.

As illustrated in FIG. 3, the spectrogram is produced by retrieving welding sound data during a period from a predetermined time before an imaging timing of the camera image to the imaging timing, and is associated with the camera image. For example, when the camera image is captured at a sec., data of welding sound for one second from a–1 to a sec. is retrieved to produce a spectrogram, which is associated with the camera image captured at a sec.

In this embodiment, as input data (in other words, as an example of data for learning and detection data), camera images and welding sound are used; however, the input data is not limited to these. The input data may include two of more of camera image, welding sound, voltage of welding power source, and current of welding power source, but preferably includes at least one of camera image and welding sound. Note that when the voltage or current of a welding power source is used, a spectrogram is produced in the same manner as for the welding sound.

Each label represents whether welding is normal or abnormal. For example, when abnormality such as burn through is observed in a camera image obtained by capturing a weld zone during arc welding, the camera image is assigned a label of "abnormality". In addition, when an abnormality in welding sound in a period is heard, the period may be assigned a label of "abnormality" or a period in which disturbance (an increase in the number of short circuits or a deviation from the average number) of the waveforms of voltage or current occurs may be assigned a label of "abnormality".

An abnormality of welding may be determined by an inspection or the like after the arc welding. For example, when a camera image obtained in a period during welding, corresponds to a position of abnormal welding identified from information, such as visual inspection, switching timing for a welding condition, ultrasonic flaw detection and non-destructive inspection using X-rays, the camera image may be assigned a label of "abnormality".

Abnormality of welding includes burn through of a molten pool and poor shielding gas performance in addition to an occurrence of a defect (such as a pit, a blowhole, slag inclusion, lack of fusion) in a surface part or inside of a weld zone.

Note that in this embodiment, the data for learning is detection data such as a camera image and welding sound generated by sensors such as the camera 21 and the microphone 22 included in the welding system 100; however, without being limited to this, the data for learning may be detection data generated by the same types of sensors as the sensors such as the camera 21 and the microphone 22.

Figure 6:
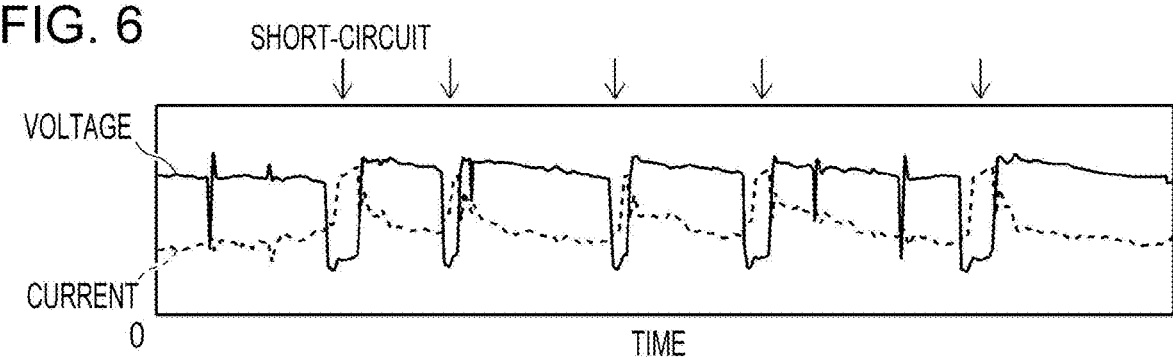
FIG. 6 is a graph illustrating an example of a voltage and a current of a welding power source.

FIG. 6 is a graph illustrating an example of a voltage and a current of the welding power source 4. In FIG. 6, the horizontal axis represents time, and the vertical axis represents the magnitude of voltage and current. The solid line in FIG. 6 represents voltage, and the dashed line represents current. The voltage and the current are obtained by performing analog-to-digital conversion, for example, with a 20 kHz sampling rate (0.05 milliseconds pitch) on the welding power source 4.

When a wire (filler metal) is used, current and voltage waveforms of droplet transfer called short circuiting transfer are observed. Specifically, when a droplet generated at the wire end is brought into contact with (short-circuited to) a molten pool, a waveform change occurs instantaneously such that the potential difference suddenly drops, and the current suddenly increases.

Figure 7:
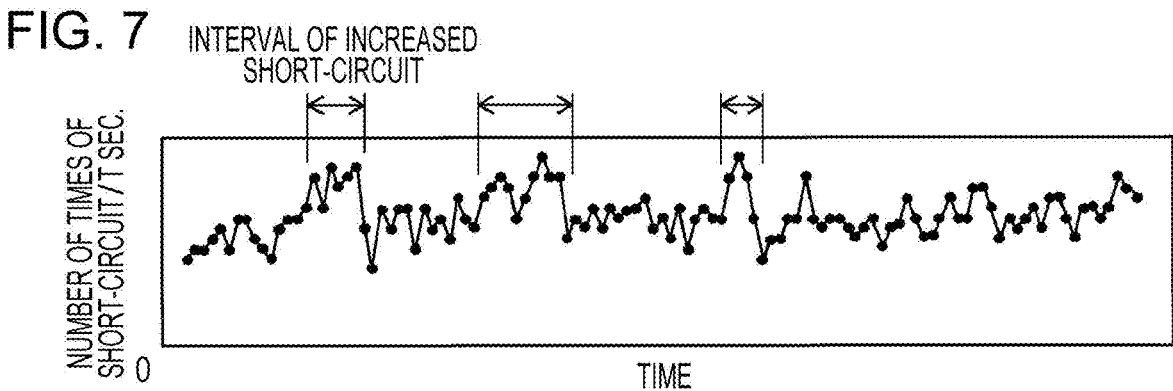
FIG. 7 is a graph illustrating an example of the number of short circuits per unit time.

FIG. 7 is a graph illustrating an example of the number of short circuits per unit time. In FIG. 7, the horizontal axis represents time, and the vertical axis represents the number of short circuits per unit time (T seconds). Note that the width of the horizontal axis in FIG. 6 corresponds to the unit time (T seconds) approximately.

Using this result, an interval of increased short-circuit in which the number of short circuits is increased is defined as an abnormal interval. Note that defects of all weld zones may not be detected only by the waveforms of voltage or current in a situation where a defect occurs in some intervals and yet the number of short circuits is not increased, thus an interval of increased short-circuit may be handled as interval of abnormal quality of voltage or current in the later-described second embodiment.

Figure 8:
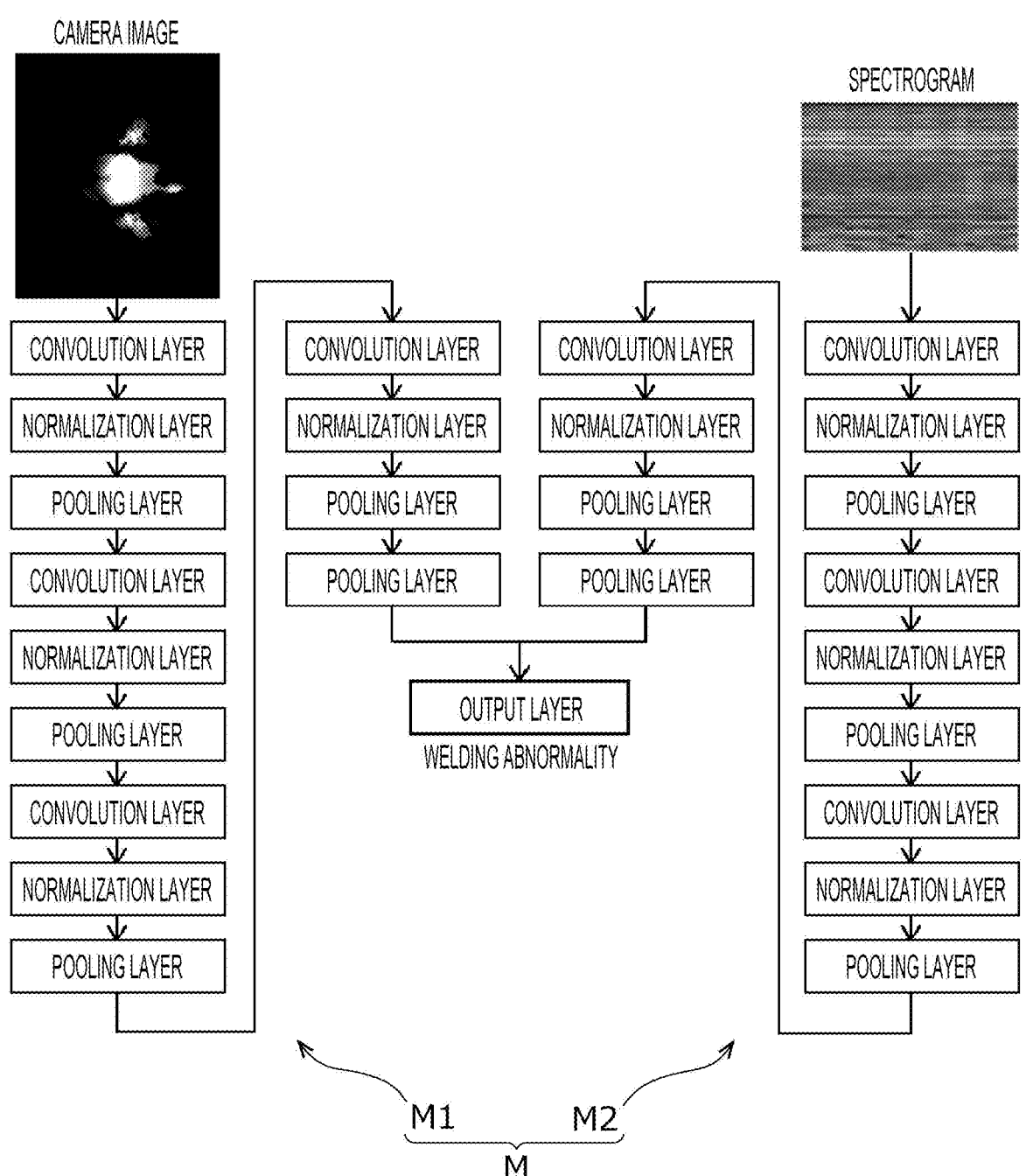
FIG. 8 is a chart illustrating an example of a trained model.

FIG. 8 is a chart illustrating an example of a trained model M generated in the learning phase. The trained model M is, for example, a convolutional neural network (CNN), and includes periodically arranged convolutional layers, normalization layers, and pooling layers, as well as the output layer provided in the last stage.

Specifically, the trained model M is a multimodal CNN including a plurality of networks M1, M2. The plurality of networks M1, M2 each include periodically arranged convolutional layers, normalization layers, and pooling layers, and are connected to the output layer provided in the last stage.

In this embodiment, the trained model M performs convolution on camera images by the first network M1 to extract feature values, and performs convolution on the spectrogram of welding sound by the second network M2 to extract feature values, then combines both feature values immediately before the output layer to estimate the welding abnormality (probability of abnormal welding).

The output layer is provided with an element corresponding to the welding abnormality. For example, a sigmoid function or a softmax function is used as the element to output a value 0 or greater and 1 or less. The output value of the output layer is used as a welding abnormality, and for example, the output value closer to 0 indicates more normal, and the output value closer to 1 indicates more abnormal.

Figure 9:
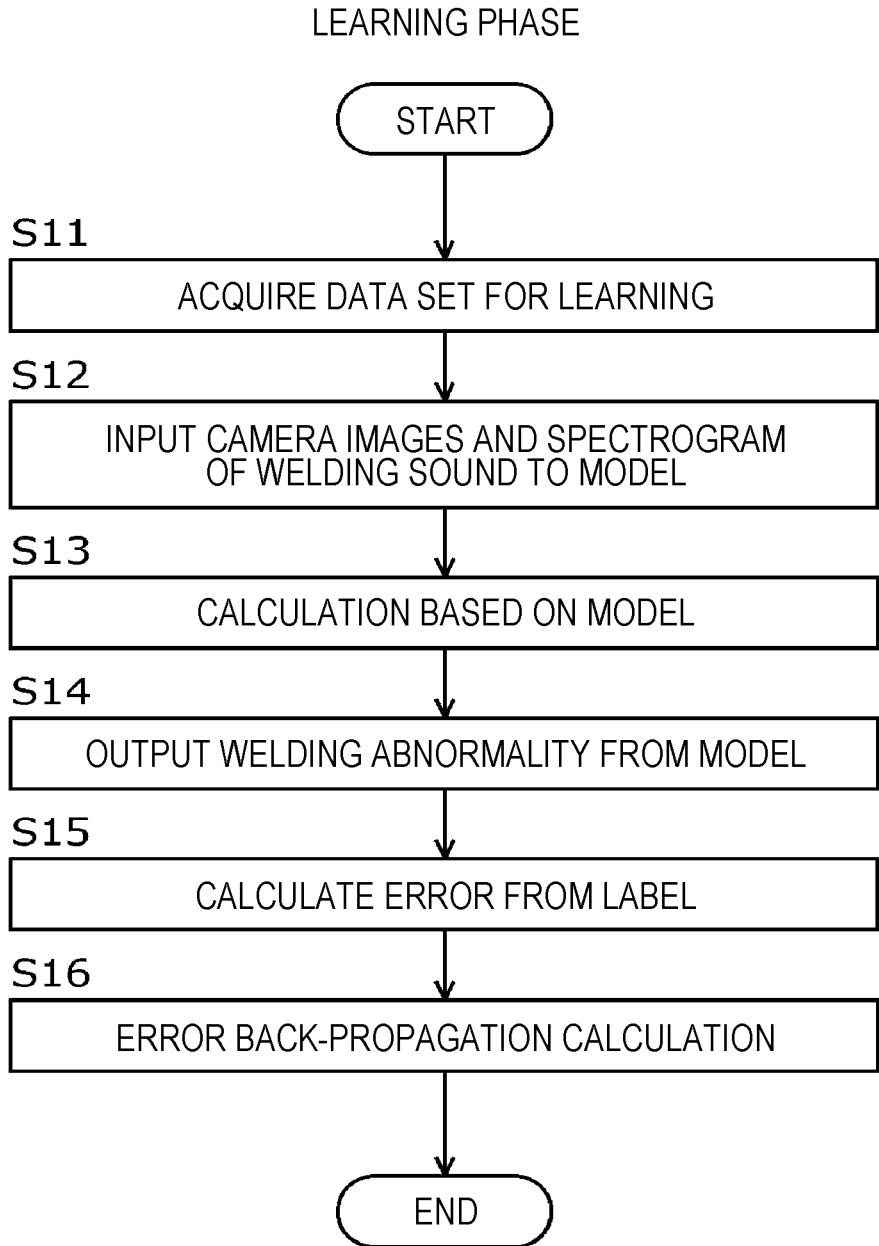
FIG. 9 is a flowchart illustrating a procedure example of a learning phase.

FIG. 9 is a flowchart illustrating a procedure example of a learning phase implemented in the learning device 6. The learning device 6 executes the information processing illustrated in FIG. 9 in accordance with a program.

First, the learning device 6 acquires a data set for learning including camera images, spectrograms of welding sound, and labels representing normal/abnormal (S11: the process as the acquisition unit 61).

Subsequently, the learning device 6 inputs, as input data, the camera images and the spectrograms of welding sound to a model (untrained model M) to perform calculation by the model, and outputs a welding abnormality from the model (S12 to S14: the processes as the learning unit 62).

Subsequently, the learning device 6 calculates the error between the welding abnormality as output data outputted from the model, and labels representing normal/abnormal as training data, and performs error back-propagation calculation to reduce the error (S15, S16: the processes as the learning unit 62).

By repeating the above processes, a trained model M to estimate the welding abnormality from the camera images and the spectrograms of welding sound is generated. The trained model M generated by the learning device 6 is stored in the storage device 5, and used in the below-described inference phase.

(3) Inference Phase

Hereinafter the inference phase implemented in the welding support device 1 will be described. FIG. 10 is a flowchart illustrating a procedure example of the inference phase. The welding support device 1 executes the information processing illustrated in FIG. 10 in accordance with a program. The inference phase is executed while the welding device 3 performs arc welding.

First, the welding support device 1 acquires camera images obtained by the camera 21 capturing a weld zone during arc welding, and welding sound during arc welding recorded by the microphone 22 (S21: the process as the acquisition unit 11).

Subsequently, the welding support device 1 generates a spectrogram of the acquired welding sound (S22: the process as the conversion unit 12).

Specifically, the welding support device 1 successively acquires, as camera images, a plurality of time series still images (frames) included in the video images generated by the camera 21, and retrieves welding sound during a period from a predetermined time (for example, 1 second) before an imaging timing of each camera image to the imaging timing to convert the welding sound to a spectrogram, and generates a pair of a camera image and a spectrogram of welding sound.

Subsequently, the welding support device 1 estimates the welding abnormality from the camera images and the spectrograms of welding sound using the trained model M generated in the learning phase and stored in the storage device 5 (S23: the process as the estimation unit 13).

Specifically, the welding support device 1 inputs, as input data, the camera images and the spectrograms of welding sound to the trained model M to perform calculation by the trained model M, and outputs a welding abnormality from the trained model M.

Subsequently, when the welding abnormality is greater than a threshold value (S24: YES), the welding support device 1 notifies the welding device 3 of abnormality of welding (S25). Upon receiving notification from the welding support device 1, the welding device 3 performs a predetermined operation such as reduction of speed or stop of forward movement of the welding torch 31.

(4) Effects

According to the embodiment described above, since the welding abnormality is estimated from the camera images and the spectrograms of welding sound using the trained model M, in-line inspection of quality of welding can be performed with high accuracy.

In addition, according to the embodiment, when a data set for learning (see FIG. 3) is generated, data for learning such as a camera image only needs to be associated with a label representing normal/abnormal as training data, thus production cost of the training data can be reduced.

In addition, according to the embodiment, welding sound can be treated as input data to CNN like a camera image by imaging the welding sound to a spectrogram, and a relationship between time, frequency, strength can be learned by performing convolution on the spectrogram.

In addition, according to the embodiment, the trained model M (see FIG. 8) can complementarily utilize the feature values extracted by the networks M1, M2 via the multimodal CNN. Therefore, abnormality of welding can be detected earlier as compared to when only images are used.

Note that the plurality of networks M1, M2 may be combined in a layer at a previous stage. Alternatively, a network for spectrogram of voltage or current may be added to implement a multimodal CNN having three or four modes.

Second Embodiment

Hereinafter a second embodiment will be described. The same components as in the above embodiment are labeled with the same numeral, and a detailed description may be omitted.

FIG. 11 is a diagram illustrating a configuration example of a welding support device 1B according to the second embodiment. The welding support device 1B further includes a similarity calculation unit 14 and a reliability determination unit 15 in addition to the acquisition unit 11, the conversion unit 12 and the estimation unit 13.

In this embodiment, the estimation unit 13 estimates not only a welding abnormality, but also a feature value of detection data. The similarity calculation unit 14 calculates a similarity between the feature value extracted from the data for learning and the feature value estimated by the estimation unit 13. The reliability determination unit 15 determines the reliability of the welding abnormality estimated by the estimation unit 13 based on the calculated similarity.

FIG. 12 is a table illustrating an example of a data set for learning used in the learning phase. In addition to camera images, spectrograms of welding sound, and labels representing normal/abnormal, the data set for learning further includes the positions of feature points of the camera images, and intervals of abnormal quality of welding sound. The positions of feature points and the intervals of abnormal quality are an example of a feature value, and used as training data.

As illustrated in FIG. 4, the feature points of a camera image include five points: the left end of a molten pool, the right end of the molten pool, the rear end of the molten pool, the center of an arc, and a wire. Of these, the left end and the right end of the molten pool are represented by x coordinate only, the rear end of the molten pool is represented by y coordinate only, and the center of an arc is represented by x, y coordinates. In short, five feature points are represented by seven variables.

An interval of abnormal quality of welding sound is, for example, a period in which a disturbance in the waveform of welding sound is observed. Abnormality of quality is assigned, for example, when abnormality of welding cannot be identified and yet the quality of welding sound itself has an abnormality, such as a disturbance in the waveform. Note that an interval of abnormal quality may be partially assigned in the spectrogram.

Figure 13:
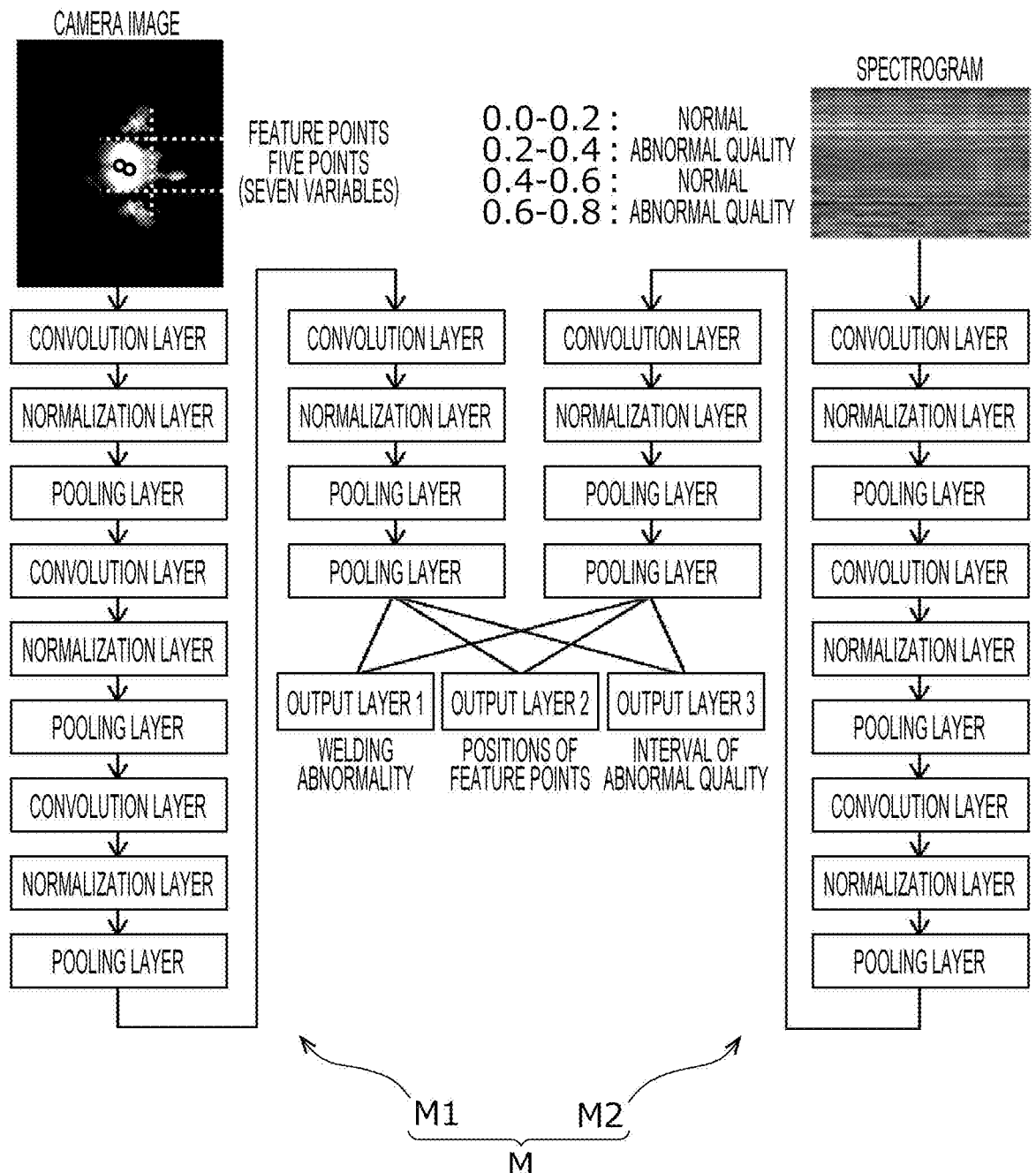
FIG. 13 is a chart illustrating another example of a trained model.

FIG. 13 is a chart illustrating an example of a trained model M generated in the learning phase. The trained model M includes a plurality of output layers, to each of which the plurality of networks M1, M2 are connected. Of the plurality of output layers, an output layer 1 corresponds to welding abnormality, an output layer 2 corresponds to position of feature point of camera image, and an output layer 3 corresponds to interval of abnormal quality of welding sound.

In this embodiment, the trained model M performs convolution on camera images by the first network M1 to extract feature values, and performs convolution on the spectrogram of welding sound by the second network M2 to extract feature values, then combines both feature values immediately before the output layer to estimate the welding abnormality, the positions of feature points of camera images, and the intervals of abnormal quality of welding sound.

In the learning phase, not only the error between the welding abnormality output from the output layer 1 and the label of normal/abnormal as training data, but also the error between the position of feature point output from the output layer 2 and the position of feature point as training data, and the error between the intervals of abnormal quality output from the output layer 3 and the intervals of abnormal quality as training data are calculated, and error back-propagation calculation is performed to reduce these errors.

Figure 14:
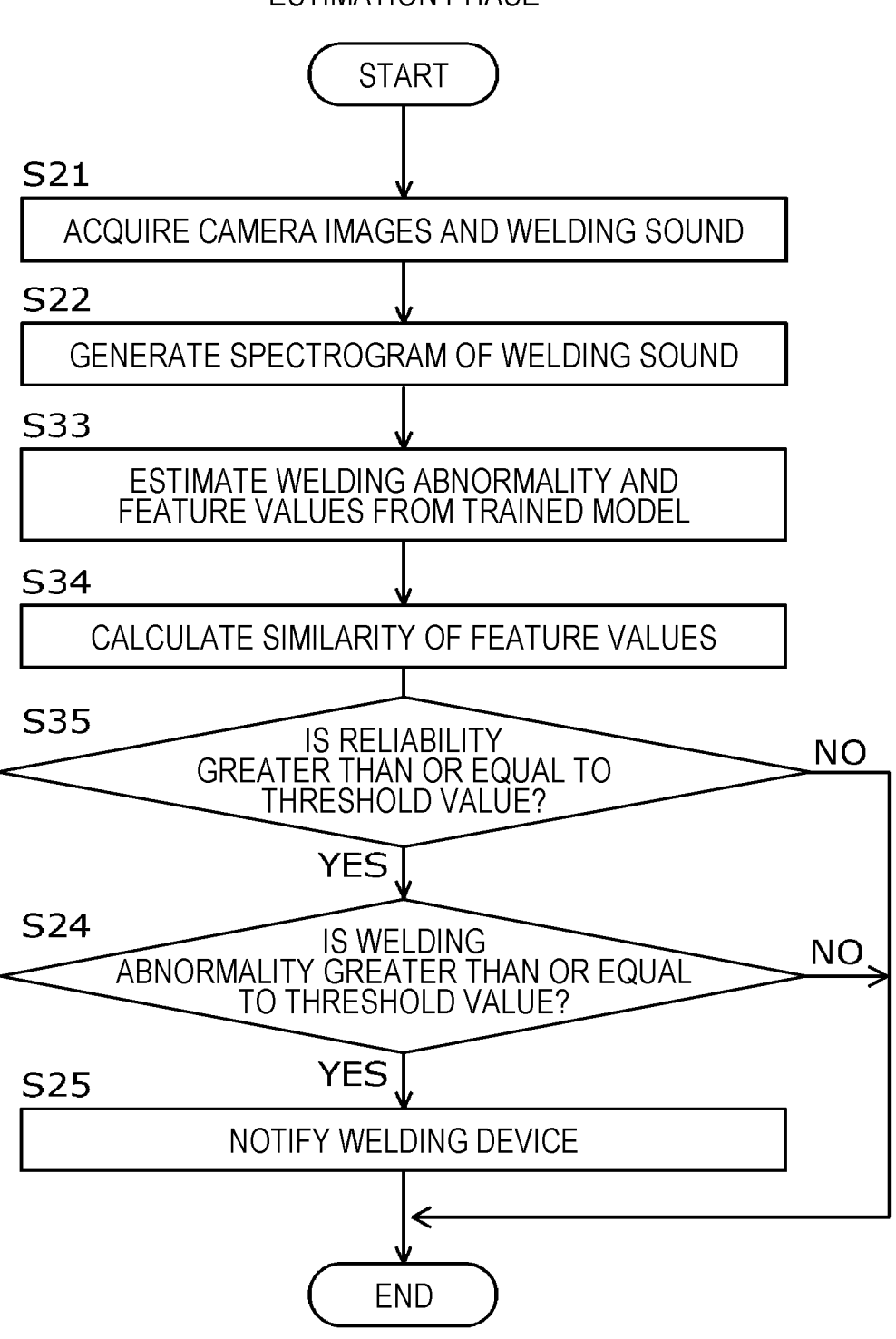
FIG. 14 is a flowchart illustrating another procedure example of an inference phase.

FIG. 14 is a flowchart illustrating a procedure example of the inference phase implemented in the welding support device 1. The same steps as in the above embodiment are labeled with the same numeral, and a detailed description may be omitted.

First, the welding support device 1 acquires camera images obtained by the camera 21 capturing a weld zone during arc welding, and welding sound during arc welding recorded by the microphone 22 (S21: the process as the acquisition unit 11), and generates a spectrogram of the acquired welding sound (S22: the process as the conversion unit 12).

Subsequently, the welding support device 1 uses the trained model M to estimate the welding abnormality, the positions of feature points of camera images, and the intervals of abnormal quality of welding sound from the camera images and the spectrograms of welding sound (S33: the process as the estimation unit 13).

Specifically, the welding support device 1 inputs, as input data, the camera images and the spectrograms of welding sound to the trained model M to perform calculation by the trained model M, and outputs the welding abnormality, the positions of feature points of camera images, and the intervals of abnormal quality of welding sound from the trained model M.

Subsequently, the welding support device 1 calculates a similarity between the feature value pre-extracted from the data for learning and the feature value estimated in S33 (S34: the process as the similarity calculation unit 14), and determines the reliability of the welding abnormality estimated in S33 based on the calculated similarity (S35: the process as the reliability determination unit 15).

For calculation of similarity, for example, a method (cosine similarity) of measuring similarity in a vector space is used. For example, the cosine similarity between vector d of estimated data and vector q of data for learning is represented by the Expression (1) below.

Expression (1)

$$\cos(\vec{q}, \vec{d}) = \frac{\vec{q} \cdot \vec{d}}{|\vec{q}||\vec{d}|} = \frac{\vec{q}}{|\vec{q}|} \cdot \frac{\vec{d}}{|\vec{d}|} = \frac{\sum_{i=1}^{|V|} q_i d_i}{\sqrt{\sum_{i=1}^{|V|} q_i^2} \cdot \sqrt{\sum_{i=1}^{|V|} d_i^2}} \quad (1)$$

Here, the vector d of estimated data represents estimated position coordinates of the feature point of a camera image. Specifically, the vector d of estimated data is represented by (arc center x, arc center y, wire x, wire y, molten pool-left x, molten pool-right x, molten pool-rear end y).

The vector q of data for learning represents the position coordinates of a feature point randomly selected from the data set for learning. Specifically, the vector q of data for learning is also represented by (arc center x, arc center y, wire x, wire y, molten pool-left x, molten pool-right x, molten pool-rear end y).

When the value of cosine similarity in Expression (1) above is close to 1, the distributions of estimated data and data for learning are similar to each other, and the reliability of the welding abnormality is high. In contrast, when the value of cosine similarity is smaller than 0.5, for example, the estimated data may not follow the distribution of the data for learning, and the reliability of the welding abnormality is low.

Subsequently, when the reliability of the welding abnormality is higher than or equal to a threshold value and the welding abnormality is higher than or equal to a threshold value (S35: YES, and S24: YES), the welding support device 1 notifies the welding device 3 of abnormality of welding (S25).

Specifically, assuming that similarity=reliability, the welding support device 1 determines in S35 whether the similarity is higher than or equal to a threshold value. When the cosine similarity of Expression (1) above is used, the threshold value is 0.5, for example.

According to the second embodiment described above, a similarity between the feature value extracted from the data for learning and the feature value estimated by the trained model M is calculated, and the reliability of the welding abnormality is determined based on the calculated similarity, thus in-line inspection of quality of welding can be performed with high accuracy.

Note that in this embodiment, both the positions of feature points of the camera images, and intervals of abnormal quality of welding sound are learned and estimated; however, without being limited to this, either one of the feature values may be learned and estimated. In addition, when the voltage or current of a welding power source is used, intervals of abnormal quality of voltage or current may be learned and estimated.

Third Embodiment

Hereinafter a third embodiment will be described. The same components as in the above embodiments are labeled with the same numeral, and a detailed description may be omitted.

In this embodiment, multimodal learning to estimate welding quality is performed using the time series data for molten pool shape measured from camera images. Thus, even when it is difficult to determine normal/abnormal with camera images, it is possible to determine normal/abnormal with highly accuracy using the time series data for molten pool shape.

(1) Learning Phase

Figure 15:
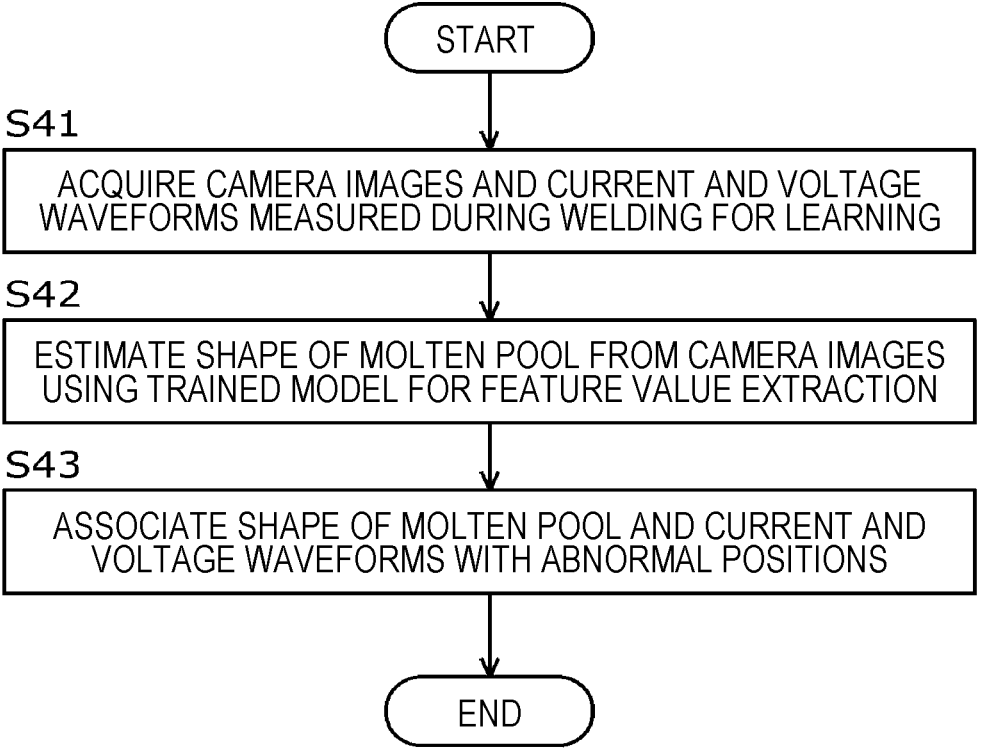
FIG. 15 is a flowchart illustrating still another procedure example of a learning phase.

The learning phase will be described. FIG. 15 is a flowchart illustrating a procedure example of creation of data for learning in the learning phase in this embodiment.

First, the learning device 6 acquires camera images and current and voltage waveforms which are measured during arc welding for learning, performed by the welding device 3 (S41).

Subsequently, the learning device 6 estimates the molten pool shape from the camera images using the trained model for feature value extraction (S42). Specifically, the learning device 6 successively estimates the molten pool shape from a plurality of time series camera images to generate time series data for the molten pool shape.

The trained model for feature value extraction is a trained model to estimate the positions of feature points of the camera images. The trained model for feature value extraction is generated by machine-learning using the camera images as input data, and the positions of feature points as training data. The trained model for feature value extraction uses the same networks to output the positions of feature points, as those included in the trained model explained in the second embodiment (see FIG. 13).

As illustrated in FIG. 4, the feature points of a camera image include the left end of the molten pool, the right end of the molten pool, the rear end of the molten pool, the center of the arc, and the tip end of the wire. In addition, the feature points of a camera image may include the front end of the molten pool.

The molten pool shape is, for example, a molten pool width which indicates the width of the molten pool in the right-left direction. The molten pool width is represented by the distance between the position of the left end of the molten pool and the position of the right end of the molten pool which are estimated by the trained model for feature value extraction.

Alternatively, the molten pool width may be, for example, a molten pool leading distance that indicates the distance by which the front end of the molten pool leads the wire. The molten pool leading distance is represented by the distance between the position of the tip end of the wire and the position of the front end of the molten pool which are estimated by the trained model for feature value extraction.

Subsequently, the learning device 6 associates the time series data for molten pool shape and the time series data for current and voltage waveforms with abnormal positions (S43). Specifically, the learning device 6 divides the time series data into intervals with a predetermined time (for example, with one second), and assigns each interval a label of normal/abnormal. A data set for learning is produced in the above manner.

Figure 16:
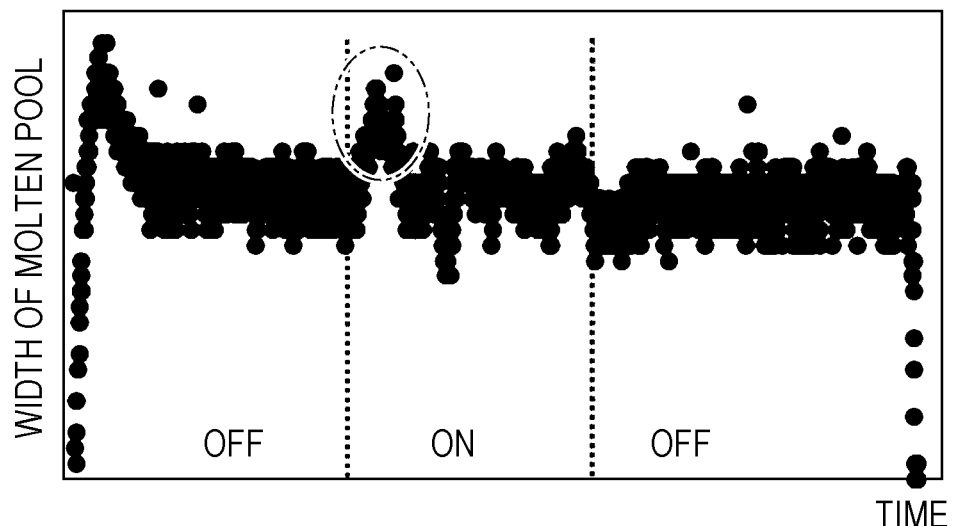
FIG. 16 is a graph illustrating a temporal change example of a molten pool shape.

FIG. 16 is a graph illustrating a temporal change example of a molten pool shape. The horizontal axis represents time, and the vertical axis represents the molten pool width. In an experiment, air is blown to a weld zone by a fan to cause poor shielding gas performance, thus a porosity defect is intentionally created. "ON" and "OFF" in FIG. 16 show an ON/OFF state of the fan.

As illustrated in FIG. 16, a disturbance of the molten pool width is seen in an ON-state period of the fan (the portion surrounded by an ellipse of a two-dot chain line). In other words, occurrence of a disturbance of the molten pool shape due to an abnormality of welding is observed.

Figure 17:
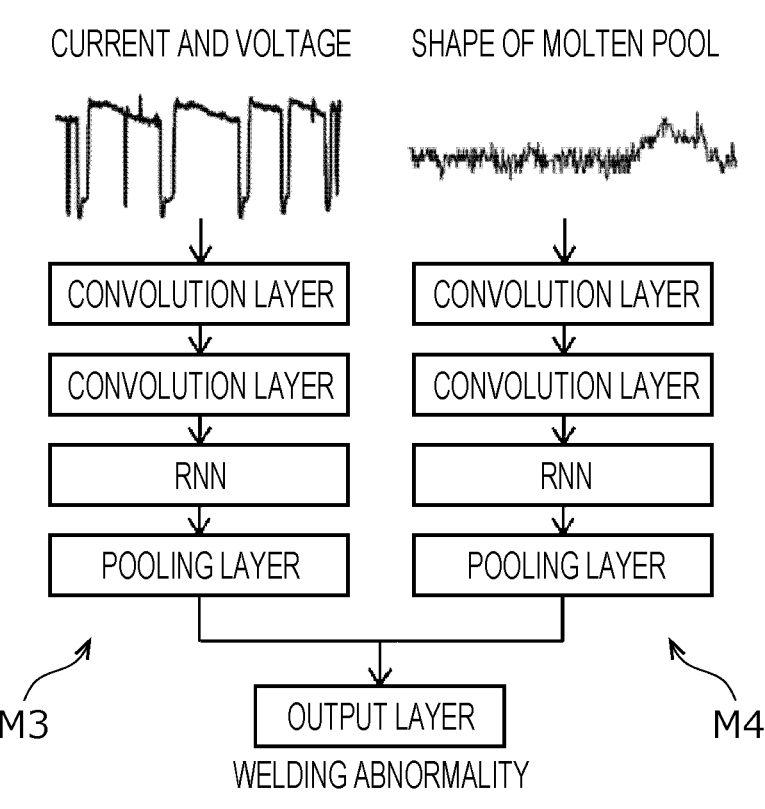
FIG. 17 is a chart illustrating still another example of a trained model.

FIG. 17 is a chart illustrating an example of a trained model generated in the learning phase in this embodiment. The trained model includes convolutional layers, RNNs (Recurrent Neural Network), pooling layers, and an output layer.

Specifically, the trained model is a multimodal RNN including a plurality of networks M3, M4. The plurality of networks M3, M4 each include convolutional layers, RNN, and pooling layers, and are connected to the output layer provided in the last stage.

The trained model extracts feature values from the time series data for current and voltage waveforms by the first network M3, and extracts feature values from the time series data for molten pool shape by the second network M4, then combines both feature values immediately before the output layer to estimate the welding abnormality.

In this embodiment, as input data (specifically, as an example of data for learning and detection data), the time series data for current and voltage waveforms and the time series data for molten pool shape are used; however, the input data is not limited to these.

(2) Inference Phase

Figure 18:
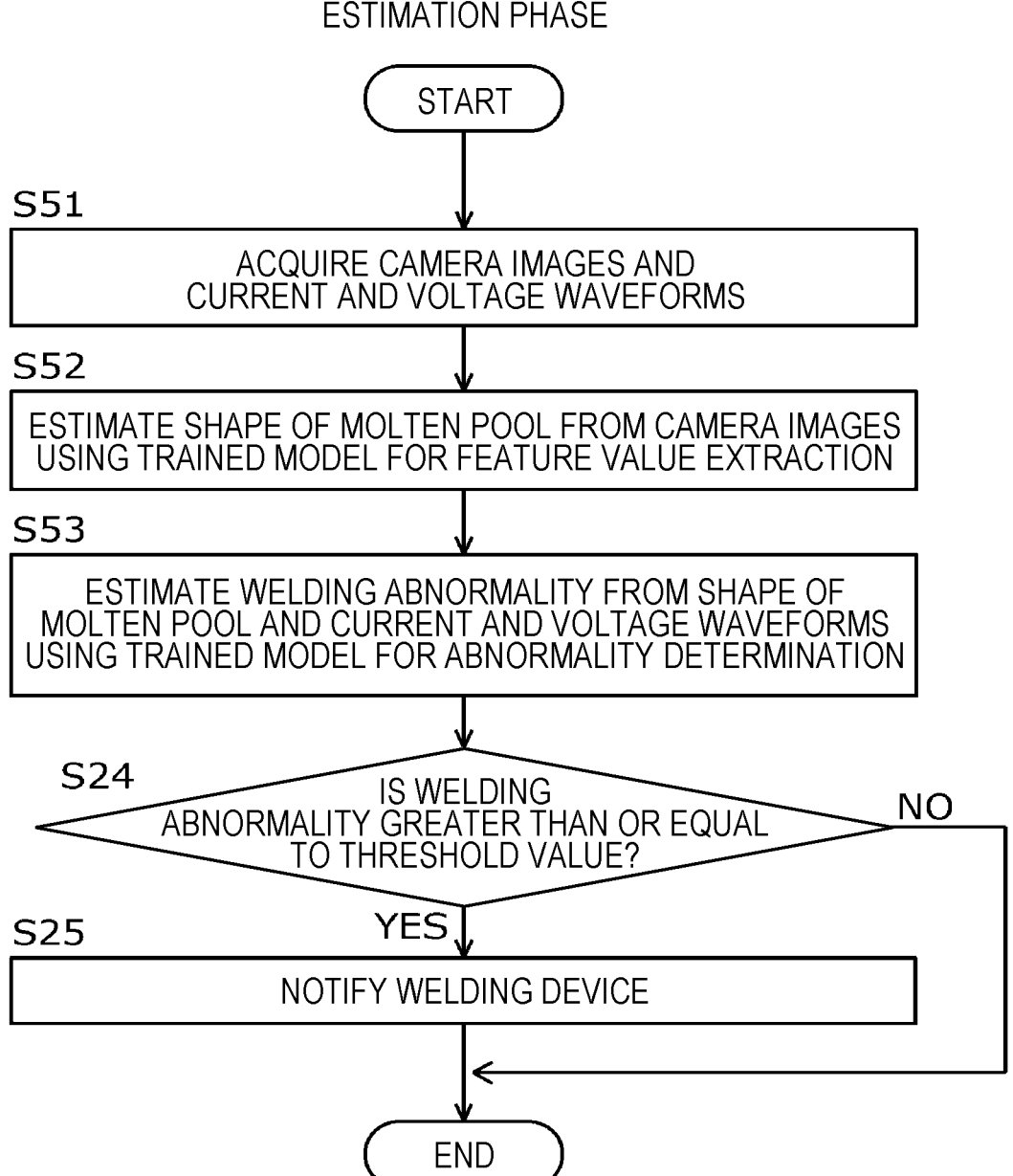
FIG. 18 is a flowchart illustrating still another procedure example of an inference phase.

The inference phase will be described. FIG. 18 is a flowchart illustrating a procedure example of the inference phase in this embodiment. The welding support device 1 executes the information processing illustrated in FIG. 18 in accordance with a program. The inference phase is executed while the welding device 3 performs arc welding.

First, the welding support device 1 acquires the camera images obtained by the camera 21 capturing a weld zone during arc welding, and the current and voltage waveforms during arc welding measured by the welding power source 4 (S51: the process as the acquisition unit 11).

Subsequently, the welding support device 1 estimates the molten pool shape from the camera images using the trained model for feature value extraction, and generates the time series data for molten pool shape (S52). This process is the same process as in S42 of the learning phase.

Subsequently, the welding support device 1 uses the trained model (see FIG. 17) for abnormality determination generated in the learning phase to estimate the welding abnormality from the time series data for molten pool shape and the time series data for current and voltage waveforms (S53: the process as the estimation unit 13).

Specifically, the welding support device 1 inputs the time series data for molten pool shape and the time series data for current and voltage waveforms to the trained model to perform calculation by the trained model, and outputs a welding abnormality from the trained model.

Subsequently, when the welding abnormality is greater than a threshold value (S24: YES), the welding support device 1 notifies the welding device 3 of abnormality of welding (S25). Upon receiving notification from the welding support device 1, the welding device 3 performs a predetermined operation such as reduction of speed or stop of forward movement of the welding torch 31.

According to the embodiment described above, even when it is difficult to determine normal/abnormal with camera images, in-line inspection of quality of welding can be performed with high accuracy by using the time series data for molten pool shape.

Although the embodiments of the present invention have been described above, the present invention is not limited to the embodiments described above, and needless to say, various modifications can be made by those skilled in the art.

Although various embodiments have been described above with reference to the drawings, needless to say, the present invention is not limited to those examples. It is apparent that various modifications and alterations will occur to those skilled in the art within the scope of the appended claims, and it should be understood that those modifications and alterations naturally fall within the technical scope of the present invention. In a range without departing from the spirit of the invention, the components in the above embodiments may be combined in any manner.

The present application is based on Japanese Patent Application (No. 2020-174445) filed on Oct. 16, 2020, the entire contents of which are incorporated herein by reference.

REFERENCE SIGNS LIST 1 welding support device
11 acquisition unit
12 conversion unit
13 estimation unit
14 similarity calculation unit
15 reliability determination unit
21 camera
22 microphone
3 welding device
31 welding torch
4 welding power source
5 storage device
6 learning device
61 acquisition unit
62 learning unit
100 welding system
M trained model
U to-be-welded member

L to-be-welded member
G groove
P molten pool

The invention claimed is:

1. A welding system comprising:
a welding device;
a plurality of sensors of different types, which detect an event according to welding performed by the welding device;
a learning device programmed to pre-generate a trained model by machine-learning by performing the steps of taking, as input data, a plurality of pieces of data for learning obtained by detecting events according to the welding by the plurality of sensors, and taking, as training data, labels representing whether each of the pieces of data for learning indicate the welding is normal or abnormal; and
an estimation unit programmed to estimate, using the trained model, an abnormality of the welding performed by the welding device from a plurality of pieces of detection data generated by the plurality of sensors.

2. The welding system according to claim 1, wherein the plurality of pieces of detection data include two or more of an image obtained by capturing a weld zone during welding, welding sound, a voltage of a welding power source, and a current of a welding power source, and include at least one of the image and the welding sound.

3. A welding system comprising:
a welding device;
a plurality of sensors in different types, which detect an event according to welding performed by the welding device; and
an estimation unit that estimates an abnormality of the welding performed by the welding device from a plurality of pieces of detection data generated by the plurality of sensors, using a trained model that is pre-generated by machine-learning by taking, as input data, a plurality of pieces of data for learning obtained by detecting events according to the welding by the plurality of sensors, and, as training data, labels representing whether the welding is normal or abnormal;
wherein one of the plurality of pieces of detection data is welding sound, a voltage of a welding power source, or a current of a welding power source,
a conversion unit is further provided configured to generate a spectrogram that represents the welding sound, the voltage of the welding power source, or the current of the welding power source in terms of three dimensions: time, frequency, and strength, and
the estimation unit inputs the spectrogram to the trained model.

4. The welding system according to claim 1, wherein the trained model generates, as training data, a feature value of at least one of the plurality of pieces of data for learning, and
the estimation unit further estimates a feature value of at least one of the plurality of pieces of detection data using the trained model.

5. The welding system according to claim 4, wherein one of the plurality of pieces of detection data is an image obtained by capturing a weld zone during welding, and
the estimation unit estimates a feature point in the image as the feature value.

6. The welding system according to claim 4, wherein one of the plurality of pieces of detection data is welding sound, a voltage of a welding power source, or a current of a welding power source, and the estimation unit estimates, as the feature value, an interval of abnormal quality of the welding sound, the voltage of the welding power source, or the current of the welding power source.

7. The welding system according to claim 4, further comprising:

a similarity calculation unit that calculates a similarity between the feature value extracted from the one piece of data for learning and the feature value estimated by the estimation unit; and a reliability determination unit that determines a reliability of an abnormality of welding estimated by the estimation unit based on the similarity.

8. The welding system according to claim 1, wherein the plurality of pieces of data for learning and the plurality of pieces of detection data are time series data.

9. The welding system according to claim 8, wherein the trained model includes a recurrent neural network.

10. A welding system comprising:

a welding device;

a plurality of sensors in different types, which detect an event according to welding performed by the welding device; and an estimation unit that estimates an abnormality of the welding performed by the welding device from a plurality of pieces of detection data generated by the plurality of sensors, using a trained model that is pre-generated by machine-learning by taking, as input data, a plurality of pieces of data for learning obtained by detecting events according to the welding by the plurality of sensors, and, as training data, labels representing whether the welding is normal or abnormal;

wherein the plurality of pieces of data for learning and the plurality of pieces of detection data are time series data; and wherein the estimation unit estimates a feature value of at least one of the plurality of pieces of detection data using a second trained model that is pre-generated by machine-learning by taking, as input data, at least one of the plurality of pieces of data for learning, and as training data, a feature value in the at least one piece of data for learning, and inputs time series data of index based on the feature value to the trained model.

11. The welding system according to claim 10, wherein the time series data of index represents a shape of a molten pool in an image obtained by capturing a weld zone during welding.

* * * * *